Figure 8:
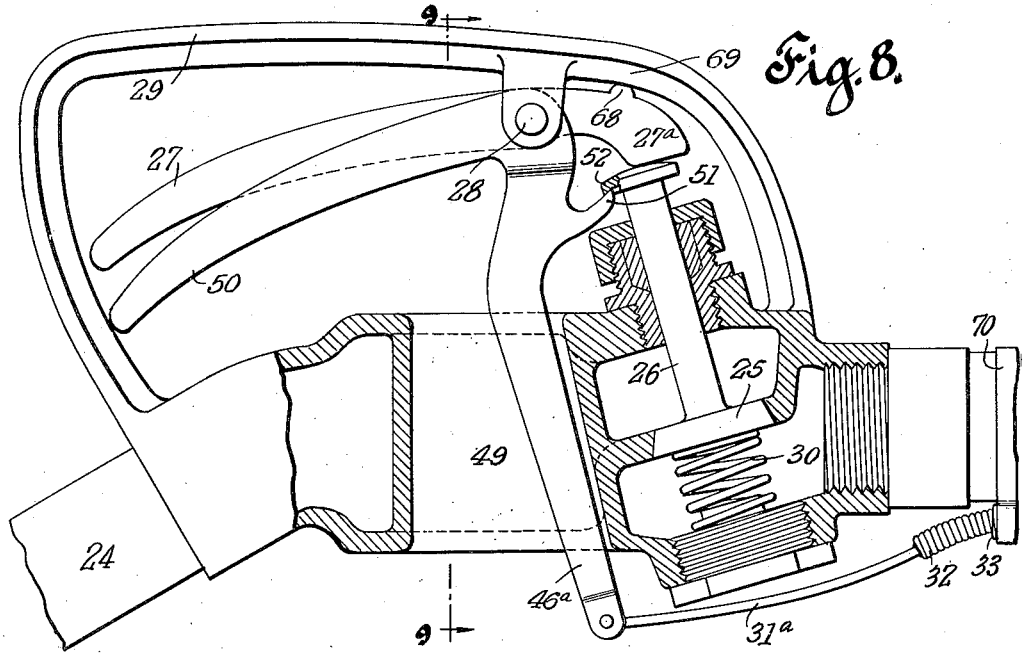

June 16, 1936.  G. W. STEDWELL  2,044,027
LIQUID DISPENSING
Filed Nov. 22, 1929   6 Sheets-Sheet 1
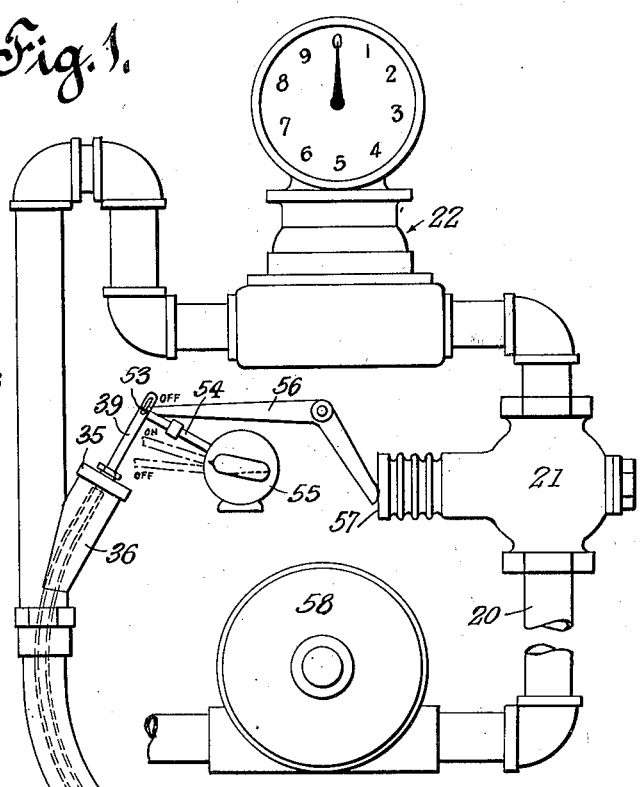
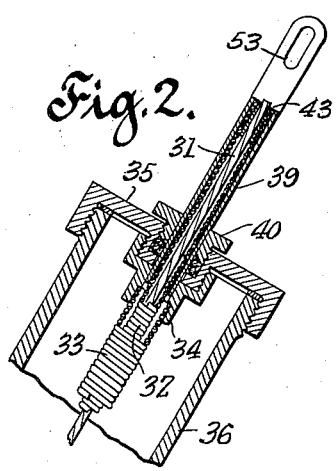
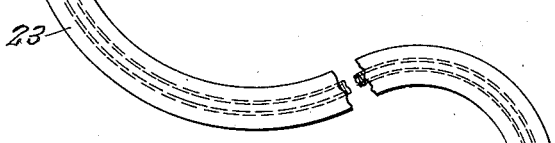
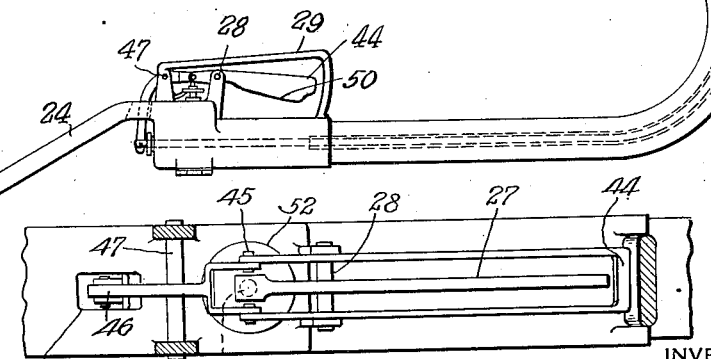
Fig. 3a.
INVENTOR
G. W. Stedwell
BY
Philip S. McGean
ATTORNEY June 16, 1936.  G. W. STEDWELL  2,044,027
LIQUID DISPENSING
Filed Nov. 22, 1929  6 Sheets-Sheet 2
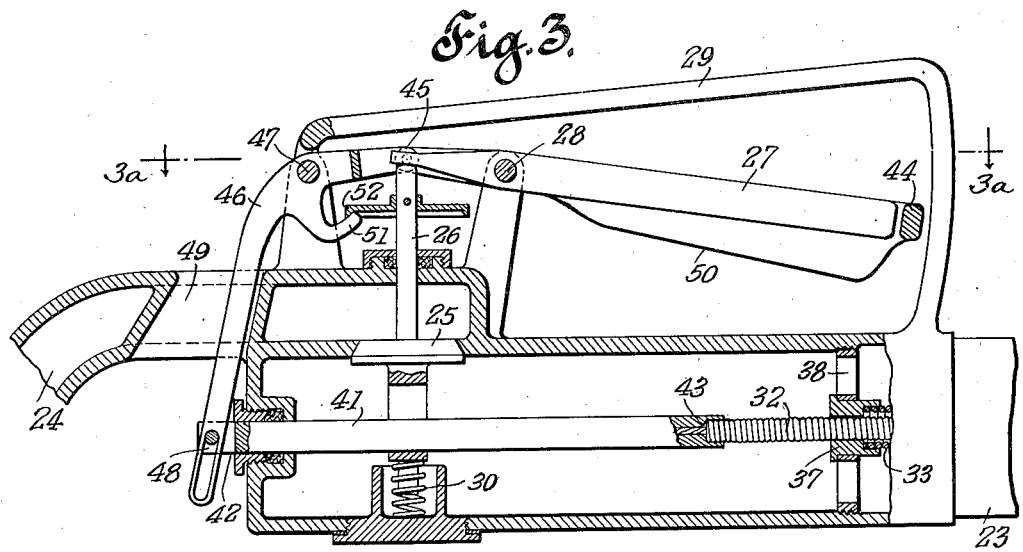

June 16, 1936.  G. W. STEDWELL  2,044,027
LIQUID DISPENSING
Filed Nov. 22, 1929   6 Sheets-Sheet 3

INVENTOR
G. W. Stedwell
BY
Philip S. McJean
ATTORNEY

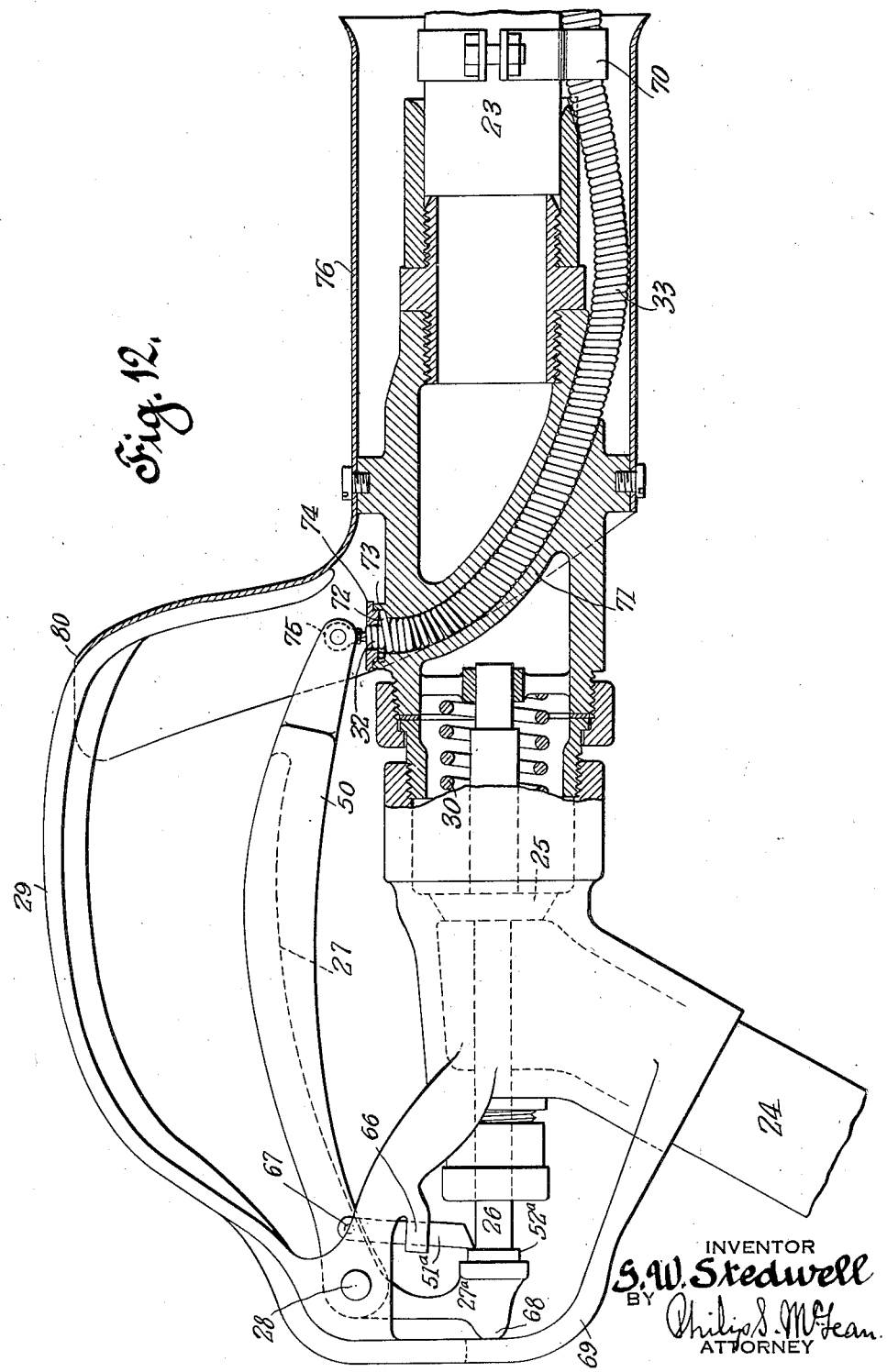

June 16, 1936. G. W. STEDWELL 2,044,027
LIQUID DISPENSING
Filed Nov. 22, 1929 6 Sheets-Sheet 5
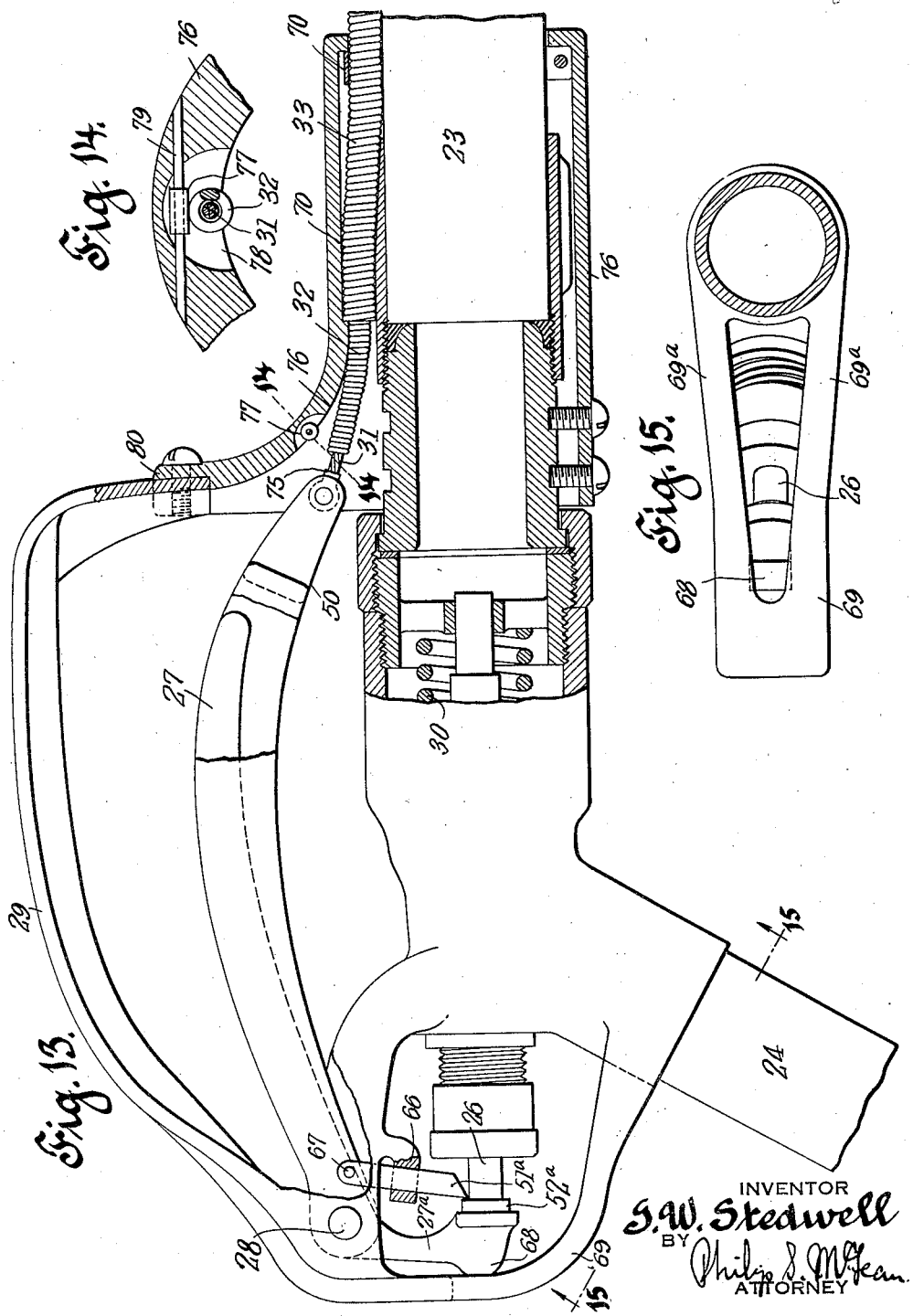
INVENTOR
G. W. Stedwell
BY
Philip S. McLean
ATTORNEY June 16, 1936.  G. W. STEDWELL  2,044,027
LIQUID DISPENSING
Filed Nov. 22, 1929  6 Sheets-Sheet 6

INVENTOR
S. W. Stedwell
BY
ATTORNEY

Patented June 16, 1936

2,044,027

UNITED STATES PATENT OFFICE 2,044,027

LIQUID DISPENSING

George W. Stedwell, Brooklyn, N. Y., assignor to Sherwell Controls, Inc., New York, N. Y., a corporation of New York Application November 22, 1929, Serial No. 409,082

19 Claims. (Cl. 221—95)

This invention relates particularly to the dispensing of hazardous liquids, such as gasoline.

In systems now generally in use, the gasoline or other liquid is delivered through a flexible hose at the end of the delivery line. It is especially desirable that the operator be able to control the delivery from the discharge end of the hose. Bowden wire connections extending back along the hose are especially desirable for the purpose, but in long continued service, a difficulty and possible source of danger has arisen. The inner member of the Bowden wire connection consists usually of a series of fine wire strands, wound with a long "lay" and forming a substantially inextensible connection. The individual wires of this member rub against the convolutions of the enclosing sheath of closely coiled wire with a degree of friction depending largely on the acuteness of bend of the hose carrying the Bowden wire. With the rough treatment and careless handling the hose receives at the ordinary delivery stand, it is not uncommon for one or more of the wires in the stranded inner member to break at a point of continued bend or other special wear. The broken wire or wires, because of their springy character immediately "ravel" and "ball up", locking the cable immovably in its sheath. These breaks usually will happen when tension is on the wire, in the liquid delivery operation and hence the mechanism may "lock" out of control in the act of delivering gasoline. This is highly dangerous and the principal purpose of the present invention is to overcome any such possibility.

Further and more specific objects of the invention are to provide remote control mechanism for liquid delivery systems, which will be accurate, safe, reliable and practical from all standpoints.

The drawings accompanying and forming part of this specification illustrate several practical embodiments of the invention, but as further modifications are possible, it will be understood that the invention is not limited to these particular disclosures.

Figure 9:
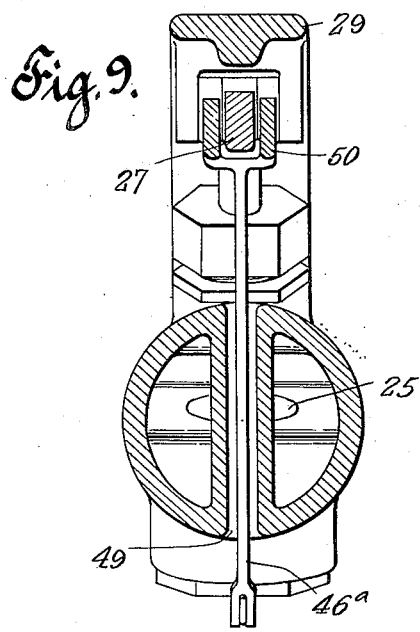
Figure 10:
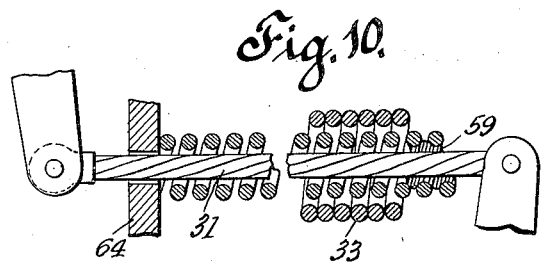
Figure 11:
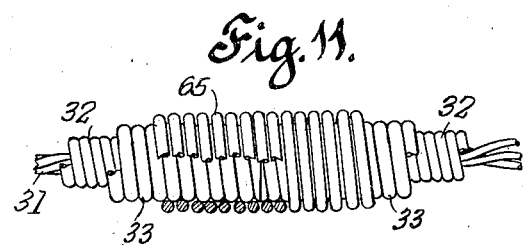
Figure 16:
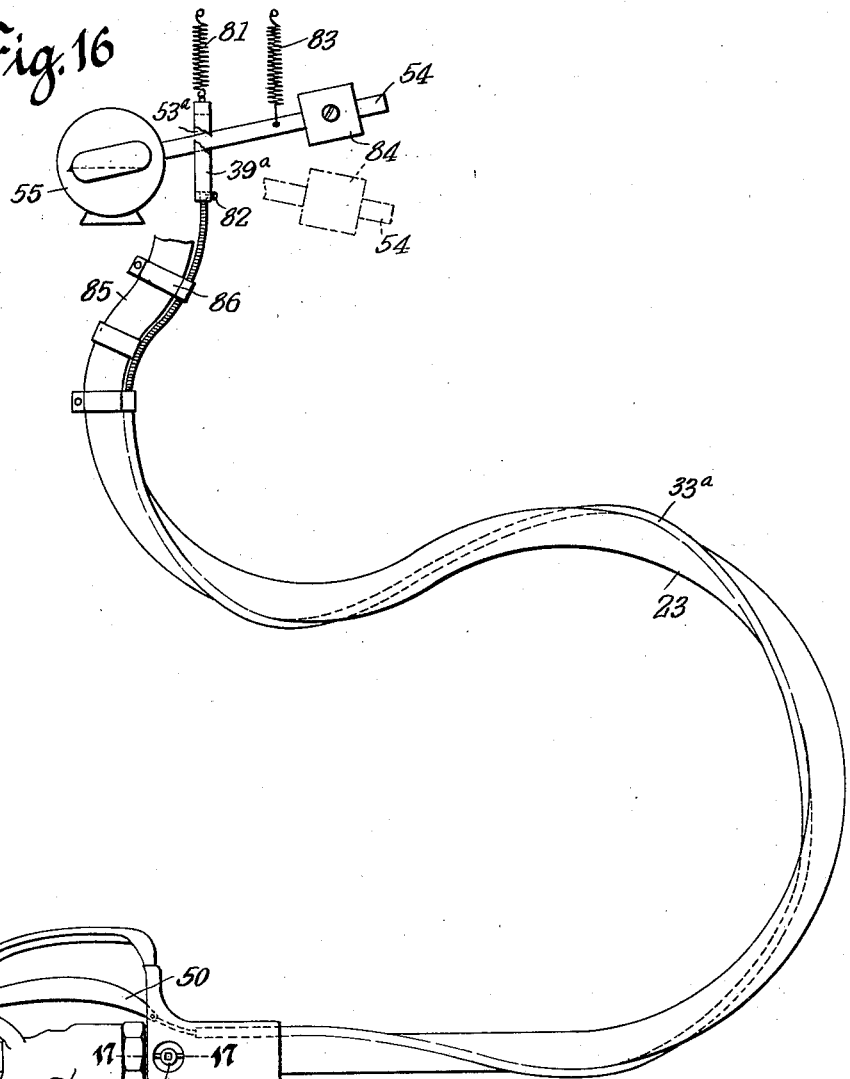
Figure 17:
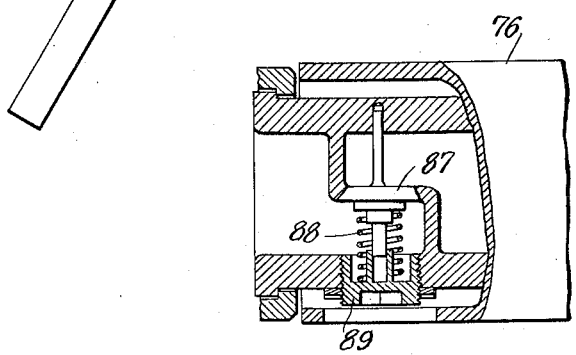

Fig. 1 is a broken side elevation showing one embodiment of the invention; Fig. 2 is an enlarged broken sectional detail view illustrating particularly the stuffing box and sliding connection for the upper end of the Bowden wire connection; Fig. 3 is an enlarged broken sectional detail view of the nozzle valve and Bowden wire construction at the lower end of the hose; Fig. 3a is a fragmental view in section taken on the line 3a—3a of Fig. 3; Fig. 4 is a broken detail illustrating the inner stranded wire connection with the enclosing protective guard sheath fastened to and travelling longitudinally with the same; Figs. 5 and 6 are further enlarged broken sectional details illustrating bending and straight positions respectively of the co-extensive stranded wire and guard sheath; Fig. 7 is a broken sectional detail illustrating a form of attaching means for the travelling guard sheath and by which the stranded wire and the sheath carried thereby can be relatively tensioned; Fig. 8 is a broken partly sectional detail illustrating another form of nozzle valve construction and showing the Bowden wire connections as located exteriorly instead of interiorly of the hose; Fig. 9 is a cross-sectional detail as on line 9—9 of Fig. 8; Fig. 10 is a broken sectional detail illustrating the wire carried guard sheath as loose at one end and operating as a spring against an abutment; Fig. 11 is a broken part sectional detail illustrating the coupling of two sections of the coiled guide sheathing by means of a surrounding coiled wire sleeve; Figs. 12 and 13 are broken part sectional views of other forms of nozzle constructions; Figs. 14 and 15 are sectional details as on lines 14—14 and 15—15 of Fig. 13; Figs. 16 and 17 are a broken side elevation and a broken sectional detail respectively illustrating further modifications.

Referring first to Fig. 1, part of the liquid delivery line is indicated at 20, the same being shown as having included in it a delivery controlling valve 21, and a suitable flow meter 22. At one end, this liquid delivery line connects with a suitable source of liquid and at the discharge end it terminates in a flexible delivery hose 23. At the discharge end, this hose is usually equipped with a suitable discharge nozzle 24.

In the form of construction shown in Figs. 1 and 3, the nozzle valve comprises a valve proper 25 having a stem 26 extending up through the top of the valve body and operated by a handle lever 27 pivoted on the valve body at 28, within the over-arching guard and handhold 29. The valve is shown as of the pressure-closed type, subjected to pressure of the delivery line and as also acted on in a closing direction by the spring 30.

The Bowden wire transmission connection is shown as extending through the hose in this first form of the invention and as made up of an inner substantially inextensible member 31 of small wires twisted with a "long lay", a closely surrounding but loosely fitting guard sheath 32 of closely coiled wire, carried by and moving with the inner member and an outer flexible guide member 33 of closely coiled wire.

The flexible outer member or guide sheath is shown in Fig. 1 as simply extending loosely through the hose but definitely held at its opposite ends, at the top in a fixture 34 carried by a cap 35 closing the end of a "bay" or offset 36 in the delivery pipe and at the lower end by a sleeve or thimble 37 carried by a spider 38 in the throat of the nozzle.

Similarly, the stranded wire and its protective sheath are definitely guided at opposite ends, by a sleeve 39 at the upper end operating through a stuffing box 40 and by a sleeve or rod 41 at the lower end operating through a suitable stuffing box 42. The stranded wire and guard sheath are suitable secured to these stuffing box sleeves as by the soldering indicated at 43.

Operation of the Bowden wire connection is effected, in the first illustration by the hand lever 44 shown as pivoted on the same axis 28 with the valve lever 27 Fig. 3 and pivoted at 45 to one arm of a bell crank lever 46 pivoted at 47 and whose other arm has a slot and pin connection 48 with the projecting pull rod 41 of the Bowden wire connection. This last named arm of the bell crank lever 46 is indicated as extending freely down through a slot or passageway 49, cored or otherwise formed through the spout of the nozzle, thus bringing it in position to exert a straight line pull in the wire connection. It is desirable that there be a time interval long enough for sufficient pressure to operate the meter to build up before the nozzle valve opens. To automatically insure the proper "lag", the Bowden wire operating lever 44 is extended below the operating lever 27 as indicated at 50 in Fig. 3, so that the hand of the operator will pull this lever in advance of the valve lever. Furthermore, an interlock may be provided, necessitating the operation of the one in advance of the other, such an interlock being shown in Fig. 3 in the form of a stop lug 51 on the bell crank lever 46 adapted to hook under on an undercut stop disc 52 on the valve stem. The prior operation of hand lever 44 will remove the stop lug 51 from the stop shoulder on the valve stem, thus to permit operation of the valve after the Bowden wire has first been operated and the interlocking relation of these elements prevents the valve from operating before operation of the Bowden wire. Hence the user in the normal intended operation of the device first pulls the Bowden wire to actuate the flow regulating mechanism and then such as mechanism puts pressure on the meter, opens the nozzle valve to permit delivery of the liquid, as it is metered.

In the illustration, Fig. 1, the Bowden wire is indicated connected at 53 to operate the arm 54 of a switch 55, which may be of the tilting mercury tube type and to operate one arm of a bell crank lever 56 adapted to actuate through sylphon connection 57 the delivery valve 21

The switch 55 may control an electric pump in the delivery line, such as indicated at 58, or it may govern the operation of an electro-magnetic valve or other means for regulating flow in the delivery line. This particular switch is indicated as having two "off" positions and an intermediate "on" position, the purpose being to protect the apparatus in case of an excessive pull on the Bowden wire, such as might possibly result from "kinking" the hose or exerting a pull such as might stretch or break the hose While the Bowden wire transmission is shown employed for operating a switch controlling a pump motor and for substantially simultaneously opening the valve in the delivery line, it will be understood that the same may be employed for actuating either one of these or other flow regulating or control devices.

The coiled wire guard sheath 32 carried by the inner stranded wire member of the Bowden wire transmission has a rolling sliding movement on the convolutions of the outer coiled wire guide sheath 33 and enables the two to work easily and smoothly in the outer casing regardless of the bending of the latter. As the stranded wire and its enclosing sheath move along as one, there is practically no friction on the stranded wire and hence no wear or tendency to break the individual strands. Should a strand fail for some reason however, the break will not throw the apparatus out of order, as the surrounding convolutions of the guard sheath will hold that strand in place, sufficiently to permit continued operation of the mechanism. As illustrated particularly in Figs. 5 and 6, the guard sheath causes the stranded wire to take an easy bend and tends to keep the stranded wire as straight as possible under existing conditions. The guard sheath on the stranded wire also has the effect of preventing the outer guide sheath of coiled wire from being bent so abruptly as to permanently distort the same. This guard sheath need be but slightly larger than the stranded wire, simply enough to permit free flexing of the two and it may be secured to the wire in various ways, possibly in some instances by simply having enough of a frictional fit on the wire to cause it to move with the wire.

Usually, the guard sheath may be simply secured at its opposite ends to the inner wire member as by the soldered joints indicated at 59, Fig. 4. In thus securing both ends, the wire and its enclosing sheath may be bent somewhat, before soldering, so that the tendency will be to return to the straight position.

If desired, special means may be provided for relatively adjusting the wire and its enclosing guard sheath. Thus in Fig. 7, the guard sheath is anchored on the wire as by soldering at one end and the opposite end of the coiled wire sheath bears against a sleeve in the form of a nut 60 engaged with a screw sleeve 61 secured on the wire as by a soldered joint 62. By turning sleeve 60 on the fixed screw member 61, it will be evident that a compression force may be placed on the end of the coiled wire sheath or be removed at will to vary the tensioned relation of these parts and that with the desired adjustment attained, the parts may be secured in this relation by a lock nut 63 threaded on the screw abutment. If the guard sheath is wound with spaced coils, the same may be utilized as a spring to tension the wire in a normally straight condition, the adjustment of the abutment screw 60 determining the degree of such tension and hence the relative stiffness of the wire. In this particular view the wire is shown as a single strand, but it will be evident that the same adjustment may be employed for the multiple stranded wire. The employment of the guard sheath definitely as a compression spring is illustrated at Fig. 10, where the same is shown bearing at its free end against a stationary abutment 64.

The embodiment of the nozzle valve illustrated in Figs. 8 and 9 is generally similar to that first described, including the features of the lever extending down through the slot formed in the valve body and the interlock to require operation of the Bowden wire for building up the meter operating pressure before opening the discharge flow. In this construction however, the wire pulling lever 46a is directly a part of the handle lever 50, it being formed as part of a bell crank therewith and carrying the hook or lug 51 for interlocking engagement beneath the stop shoulder 52 on the valve stem. As the Bowden wire transmission in this instance is mounted on the outside of the hose, no special stuffing box or other such arrangement is required and the end of the wire may be directly connected with the pull lever.

Where it is desired to couple together two sections of the outer guide sheath in end to end relation or to connect the end of the guide sheath with a similarly shaped fitting, this may be accomplished by means of a relatively short length of coiled spring wire, such as that shown at 65 in Fig. 11, "screwed" over the adjoining ends of the two sections, or over the end of one section and the correspondingly shaped abutment to which that section is to be secured. In the example, two sections of the coiled wire casing are indicated 33, but it will be evident that one of these sections might be a similarly shaped supporting fitting to which the sheathing is secured by the surrounding screwed on spring coil 65. This coupling coil may be of somewhat smaller gage wire than the casing wire and coiled to slightly less than the external diameter of the guide sheath, so as to wedge and interlock over the convolutions of the casing, as it is screwed into position thereover.

In the forms of the invention illustrated in Figs. 12 and 13, the time and interlocking is effected by means of a stop plunger 51a slidingly guided in a bearing 66 and pivotally connected at 67 with the Bowden wire actuating hand lever 50, so as to be withdrawn from behind the head 52a on the valve stem before the lever 27 is reached by the hand to force in the valve stem. In these constructions, as in the Fig. 8 construction, the hand lever 27 has an extension 27a projecting beyond the pivot 28 for engaging the head on the end of the valve stem and a positioning stop 68 for engagement with an overstanding guard 69 to prevent the lever from dropping below the Bowden wire actuating lever. In both Figs. 12 and 13, the Bowden wire connection is carried along the outside of the hose, in the first of these along the underside of the hose and in the second, along the top of the hose, being suitably so confined, for instance, by means of a surrounding clamp or cover construction 70. To bring the end of the wire up into position for a direct pull by the lever, the Bowden wire structure is extended up through a conduit 71, cored or otherwise formed up through the bore of the nozzle body in Fig. 12, the end of the guide casing being shown as anchored at the top by having its end convolution 72 spread and seated in a pocket 73 where it is secured by a clamp screw 74.

In Fig. 13, the end of the wire is connected directly with the hand lever 50 by an end pivot fitting 75 and to reduce friction where the guard casing of the wire bends up under the guard structure 76, a guide roller 77 or the like, may be provided substantially as shown in Fig. 14, said roller being shown as supported in a cavity 78 in the underside of the guard on a pivot pin 79. To provide clearance for machining the guide 66 for the latch pin or stop 51a, the guard 69 may be forked as indicated most clearly at 69a in Fig. 15. The casing 76 in Figs. 12 and 13 which confines the Bowden wire connection to the outside of the hose at the nozzle end of the hose serves as a mechanical protection for the Bowden wire connection and is of benefit in preventing too abrupt bending of the hose adjacent its connection at the nozzle. As illustrated at the views mentioned, this housing may be coupled with the guard or nozzle handle 29, substantially as indicated at 80 to form a substantially continuous sheathing for these parts of the mechanism.

It will be apparent from the foregoing that the Bowden wire construction may be utilized to operate both the switch and the valve, either a valve or a switch, or some other device or devices for controlling or governing the dispensing of the liquid. To operate such device or devices, it has been found desirable to interpose a certain degree of "lost motion" in the line of connection. This lost motion may be variously provided, for instance, in Figs. 1 and 2, the connection designated 53 is a pin and slot connection between the end member 39 of the Bowden wire and the arms 54, 56 of the switch and valve devices. The length of this slot may depend on the length of the hose, the "stretch" of the hose and other such factors.

An additional degree of "lost motion" is, or may be provided as shown in Fig. 16 by spiralling the Bowden wire connection about the axis of the hose, either inside the hose as in patent application Ser. 362,949, or on the outside of the hose as here indicated at 33a. In practice it has been found that two complete turns are about right for a 10 foot hose.—But this of course, may vary with the diameter of the hose, the degree of flexibility of the same, etc. This construction and relation of Bowden wire and hose enables the hose to be twisted and turned into various extreme positions without placing sufficient tension on the wire to pull the switch or operate whatever other control device may be employed.

In Fig. 16, a "lost motion" coupling similar to that illustrated in Fig. 1 is employed in the form of a link 39a slotted as at 53a to accommodate the switch arm 54. This slotted link is pulled upwardly by a spring 81, which serves also to place the return tension on the Bowden wire.

The pull wire is shown as adjustably connected with the "lost motion" link by a set screw 82, which enables the desired initial relation of these parts to be accurately determined or changed as conditions may require.

The switch is shown as automatically returned to its off position by a spring 83 connected with the switch arm 54 and the latter is shown equipped with an adjustable weight 84, which can be set to automatically throw the switch to the lower "off" position in case of breakage of the spring 83.

It has been found that easier action of the Bowden wire is obtained by providing a reversely curved rigid section of piping 85 at the upper end of the hose, the same directing the Bowden wire by guide 86 in such position that it will operate freely in all conditions of the hose. This construction in effect "lines" up the end portion of the pull wire in proper relation to the hose and the switch or other control device and prevents any binding at the lost motion coupling between the wire and such device.

It will be noted that by connecting the wire with the free end of the relatively long lever handle 50, a pull of considerable length can be imparted to the wire, sufficient to take up the lost motion, in all twisted conditions of the hose and to then operate the switch or other control device. The connecting of the wire with the free end of the lever also is an advantage in the arrangements disclosed, where the handle is pivoted out at the far end of the nozzle, since in this arrangement the end of the wire leads naturally direct to the free end of the lever under the hollow guard.

Figs. 16 and 17 also illustrate the automatic pressure valve 87 in the nozzle head in advance of the manually operable valve 25, which is loaded with a spring 88, so as to open only when sufficient pressure has developed to properly operate the meter. The adjustment of this opening pressure is provided in the illustration by the screw plug 89 in the side of the nozzle, forming an abutment for the outer end of the spring. Thus the opening pressure of this valve may be accurately determined to insure that flow from the nozzle can only occur when a proper pressure is on the meter to accurately operate the same. It will be understood that this valve may be located anywhere in the line between the meter and the nozzle valve.

This construction provides in effect a "timed relation" between the nozzle valve and flow governing means, in a flow meter system, insuring the building up of the proper operating pressure before liquid is actually delivered on the meter from the hose. The pull on the Bowden wire takes up the lost motion and throws the switch to start the pump before the outlet valve, whether that be the nozzle valve or some other valve ahead of the meter is opened. In other words, the outlet or delivery valve ahead of the meter remains closed until the pump builds up the required pressure to properly operate the meter—this pressure in the standard disc-type flow meters usually amounts to something between two and three pounds.

The automatic pressure opening valve constitutes in effect a "safey feature", which will operate to hold back the flow, even in the event of some failure in the pull connection mechanism, until the proper operating pressure on the meter is developed.

The present disclosure shows how lost motion may be provided in a number of places, that is first at the nozzle, where the nozzle valve is not picked up by the hand until after the pull wire has been operated, which insures the sequential operation of the valve after the pump switch; second the lost motion afforded by the spiralling of the Bowden wire which aids in insuring proper operation of the Bowden wire in all twisted conditions of the hose; third the lost motion at the upper end of the Bowden wire connection, which with the spiralling of the Bowden wire prevents "false" operation of the switch by extreme twisting or stretching of the hose. The slotted link coupling at the switch end of the Bowden wire also enables the switch to automatically drop to the off position in case of failure of the return spring.

In making up the stranded wire with the guard casing, the present practice is to slip this spirally wound casing over the stranded cable solder one end fast, then bend the assembly in a wide loop and solder the other end while in this looped condition. This will provide a certain amount of tension on the spiral guard casing as the wire approaches a straight condition and this tension enables the wire to work freely in the outside housing in its various bent positions. The outside guide casing may be held in its spiralled relation on the hose by weaving the outer fabric of the hose over the same while in this spiralled relation, it being then fixedly clamped in this condition at opposite ends of the hose, all as substantially indicated at Fig. 15. The cable unit, that is the stranded wire with the guard casing fixed at the ends thereof may then be slipped through this spirally held housing, after which it is secured at one end to the device which operates it, or the device which it operates. The other or free end of the cable unit is then twisted about its axis to insert a degree of tension and fixedly secured to the device, which it operates or is operated by. This securing of the cable unit, while in this spirally tensioned condition, also gives it a certain degree of spring force, enabling it to operate freely regardless of the flexing of the hose, to compensate in a way for stretch of the hose. The guard casing being loose, on the wire, except at the ends, where it is fastened, enables the entire unit to twist more or less readily and prevents any kinking of the wire, such as might have a tendency to break individual strands of the same.

The separate operation of the two hand levers at the nozzle permits the nozzle valve to snap closed ahead of the return of the Bowden wire lever. The valve closing spring may be made fairly heavy to insure this operation.

It will be understood that the relative shifting of the parts of the Bowden wire may be reversed and the guide casing be the movable member of the combination, instead of the wire and its protective covering. Other changes may be made all within the scope of the invention as will be clear from the broad scope of the following claims:

What is claimed is:

1. In liquid dispensing systems, the combination of a flexible hose and a discharge nozzle carried thereby, said nozzle having a substantially transverse passage therethrough closed to the flow passage of the nozzle, but open at top and bottom, a lever operating in said passage, a flexible mechanical connection operatively connected to said lever and extending from said nozzle back along the hose, liquid flow regulating means operated by said flexible mechanical connection, valve means controlling liquid flow from the nozzle and delayed action means for insuring sequential operation of said lever and valve means, including locking mechanism for securing one against operation until the other has been actuated.

2. In liquid dispensing systems, a liquid dispensing hose having a nozzle valve, a flexible mechanical connection extending from said nozzle valve back along the hose, flow regulating means actuated by said flexible mechanical connection, separate actuating devices for said nozzle valve and said mechanical connection and means for insuring sequential operation of said separate actuating devices.

3. In liquid dispensing systems, a liquid dispensing hose having a nozzle valve, a flexible mechanical connection extending from said nozzle valve back along the hose, flow regulating means actuated by said flexible mechanical connection, separate actuating devices for said nozzle valve and said mechanical connection, means for insuring sequential operation of said separate actuating devices and for locking one of such devices inoperative until the other device has been actuated.

4. In liquid dispensing systems, a nozzle valve, means for regulating flow to said nozzle valve, operating mechanism for said flow regulating means and separate actuating handles for said mechanism and for said nozzle valve, said handles being substantially coextensive, so as to be operable both by one hand.

5. In liquid dispensing systems, the combination with a liquid flow line of separate means for regulating flow in said line and individual hand levers for effecting actuation of said separate means, said hand levers being substantially coextensive to be conjointly operated by one hand.

6. In liquid dispensing systems, the combination with a liquid flow line of separate means for regulating flow in said line, individual hand levers for effecting actuation of said separate means, said hand levers being substantially coextensive to be conjointly operated by one hand and means for enforcing operation of one of said devices in advance of the other.

7. In combination, a liquid delivery hose provided with a nozzle, a substantially straight lever pivoted at one end on the nozzle and a Bowden wire operating connection engaged with the other free swinging end of said lever, whereby the maximum movement of said lever will be imparted to said Bowden wire connection.

8. In combination a liquid delivery hose provided with a nozzle, a substantially straight lever pivoted at one end on the nozzle, a Bowden wire operating connection engaged with the other free swinging end of said lever, whereby the maximum movement of said lever will be imparted to said Bowden wire connection and a fixed guide for directing the movement of said Bowden wire connection adjacent the end of said lever.

9. In a liquid delivery system, the combination of a liquid delivery line, a flow meter in said delivery line, a flexible delivery hose at the end of said delivery line, a delivery controlling valve between said meter and the discharge end of said hose, an electric switch, an electric pump in the delivery line and controlled by said switch, an automatically opening pressure operated valve set to enable flow from the hose only when the pressure on the meter is sufficient to properly operate the same and means for successively operating the switch to start the pump to put pressure on the meter and to then operate the delivery valve to permit discharge of metered quantities of liquid from the hose when so permitted by the automatic pressure operated valve.

10. In a liquid dispensing system, a dispensing conduit, means for forcing a flow of liquid through the conduit, a pair of manually operable flow controlling actuators, means for preventing manual operation of one of the actuators while the other is in normal idle position, and means adapted to automatically restore the actuators to idle position when released.

11. In a liquid dispensing system, a dispensing conduit, means for forcing a flow of liquid through the conduit, a pair of manually operable flow controlling actuators, means for preventing manual operation of one of the actuators until the other actuator has been operated, and means adapted to automatically restore the actuators to normal idle position when released.

12. In a liquid dispensing system, a dispensing conduit, means for forcing a flow of liquid through the conduit, a pair of manually operable actuators for controlling the flow through the conduit, and a latch controlled by one of the actuators for preventing operation of the other actuator until the latch controlling actuator is operated.

13. In a liquid dispensing system, a dispensing hose, means for forcing a flow of liquid through the hose, a controller for said means including a manually operable control lever, a valve controlling said flow including a manually operable valve lever, and means preventing operation of the valve lever as long as the control lever is in normal idle position.

14. In a liquid dispensing system, a dispensing hose, an electrically driven pump for forcing liquid through the hose, means controlling energization of the pump including a normally open switch and an operating handle therefor, a valve controlling the flow through the hose including a manually operable valve handle, and means preventing operation of the valve handle as long as the switch handle is in normal open position.

15. In a liquid dispensing system, a dispensing hose having a nozzle and a nozzle valve, means for supplying liquid under pressure to the hose, control means comprising a pair of separate actuating devices at the nozzle for operating said valve and said liquid supplying means respectively, and a lock adapted to hold one of the devices inoperative until the other has been operated.

16. In a liquid dispensing system, a dispensing hose having a nozzle and nozzle valve, means for supplying liquid under pressure to the hose, control means comprising a pair of separate actuating devices at the nozzle for operating said nozzle valve and said liquid supplying means respectively, and a lock adapted to prevent operation of the valve actuating device as long as the other actuating device is not operated.

17. In a liquid dispensing system, a dispensing hose having a nozzle and nozzle valve, means for supplying liquid under pressure to the hose, control means comprising a pair of levers at the nozzle for operating the valve and the liquid supplying means respectively, said levers being adapted for conjoint manual operation, one of the levers being embraced within the other with a lost motion between the levers, whereby the valve lever will be inaccessible for operation until the other lever has been operated to take up said lost motion and actuate the flow supplying means.

18. In a liquid delivery system, the combination of a liquid delivery line having a discharge nozzle, a delivery-controlling valve in said nozzle, a flow meter in said delivery line, means for delivering liquid under pressure through the line, control means constructed and arranged to effect conjoint opening said nozzle valve and starting said delivery means, a check valve in the line between the meter and the nozzle valve and opening toward the nozzle valve, and a spring acting on the check valve, said spring being of such power as to prevent delivery of liquid until the pressure of the liquid on the meter is sufficient for accurate operation of the same.

19. In a liquid delivery system, the combination of a liquid delivery line having a discharge nozzle, a delivery-controlling valve in said nozzle, a flow meter in said delivery line, means for delivering liquid under pressure through the line, control means constructed and arranged to effect conjoint opening said nozzle valve and starting said delivery means, a check valve in the nozzle and opening toward the discharge end thereof, and a spring acting on the check valve, said spring being of such power as to prevent delivery of liquid until the pressure of the liquid on the meter is sufficient for accurate operation of the same.

GEORGE W. STEDWELL.